F. W. KROGH.
SAND PROTECTING DEVICE FOR TURBINE PUMPS.
APPLICATION FILED FEB. 12, 1914.
1,328,234.
Patented Jan. 13, 1920.
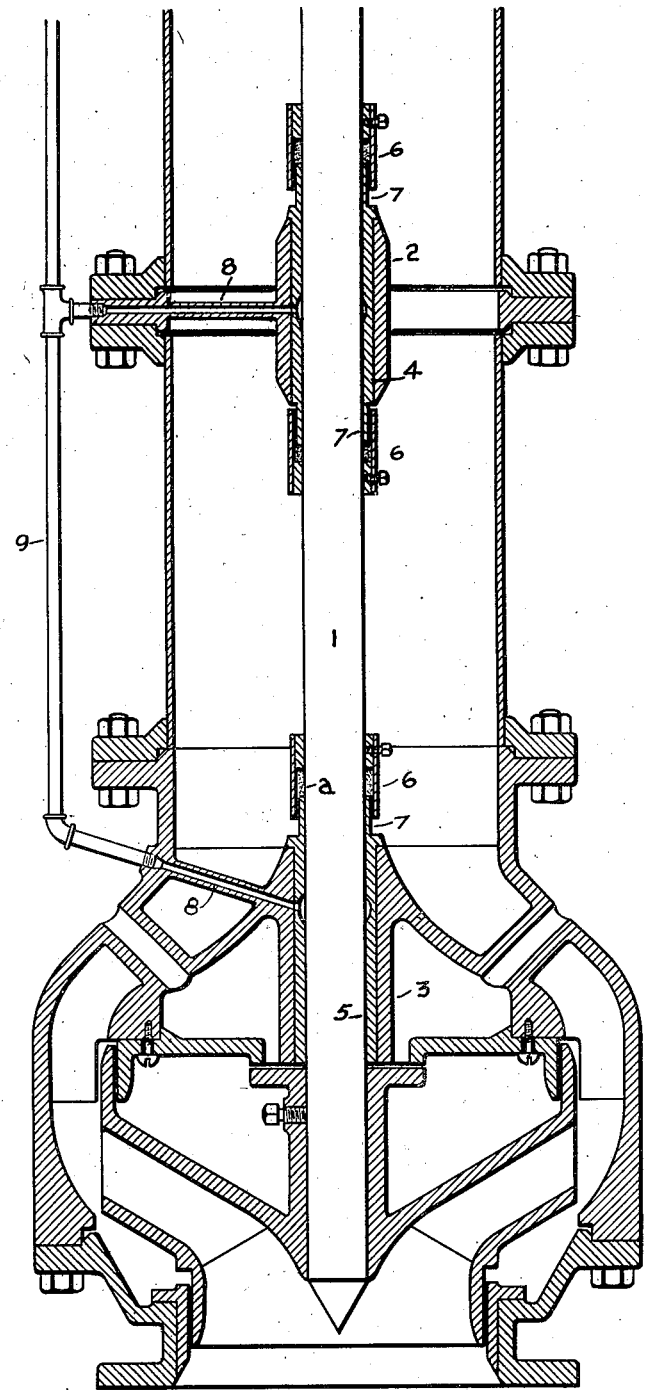
WITNESSES.
O. Poulsen
M. Markel.
INVENTOR
F. W. Krogh.
per A. S. Paré
ATTORNEY.

UNITED STATES PATENT OFFICE.

FERDINAND W. KROGH, OF SAN FRANCISCO, CALIFORNIA.

SAND-PROTECTING DEVICE FOR TURBINE-PUMPS.

1,328,234.  Specification of Letters Patent.  Patented Jan. 13, 1920.

Application filed February 12, 1914. Serial No. 818,240.

*To all whom it may concern:*

Be it known that I, FERDINAND W. KROGH, of San Francisco, California, have invented certain new and useful Improvements in Sand-Protecting Devices for Turbine-Pumps, whereof the following is a specification.

This invention relates to improvements in centrifugal deep well pumps and more particularly to the bearing and lubrication thereof.

Among the objects sought to be accomplished are:

To provide means for forcing heavy oils or greases into the bearings of the pump shaft;

To provide sand guards or shields coöperating with the grease exuding from the bearings to prevent the entrance of water in which the bearings may be submerged, that may carry sand or grit deleterious to the bearings. Other objects and advantages will appear as the description progresses.

The drawing, being a single sheet, discloses a type of vertical centrifugal deep well pump in vertical cross section, illustrating one form of the application of this invention thereto.

In detail the construction illustrated in the drawing includes the vertical shaft 1, journaled in the bearings 2 and 3, provided with the anti-friction metal bushings 4 and 5, within which the shaft revolves. These bearings being located within the pump casing are surrounded by the water being discharged therethrough. Great difficulty has been experienced in this type of pump in excluding from the bearings the gritty water, by which they are surrounded, causing as it does the rapid cutting out of the journals. This serious objection is eliminated by this invention, in which the sand guards 6, fixed in the shaft at opposite ends of the several bearings of the shaft and telescoping over the annular depressed necks 7, extending outward from the bushings and forming thereby running joints therebetween; sufficient space is allowed at these various points to accommodate suitable packing, *a*. The guards 6 are a close fit over the necks 7 and perform the dual function of keeping the water out and the lubricant in; except that the quantity of lubricant properly exuding, as new lubricant is forced into the bearings. This exudation acting as a seal for excluding water at the bearings as described.

The lubricating system includes the by-pass 8, extending from the interior of the bushings in the several bearings, to a pipe 9, extending upward to the surface, where it is adapted to be connected to any suitable pressure system such as may be, force pump or other device not shown, for causing the desired lubricant to flow, or be forced into the bearings, fed thereby.

The lubricant escaping from the bearings will float upward with the water being discharged through the casing and may be skimmed off and used again.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit of the invention. What I claim and desire to secure by Letters Patent of the United States is the following, to wit:

Claim:

In combination with the rotary shaft and its stationary bearing of a deep well pump, a double ended bushing for said bearing, provided at its ends with projecting annular depressed necks, means for oiling said bearing, sand guard devices fixed on said shaft provided with sleeves telescoping said depressed necks forming running joints therewith and chambers at the end thereof, a packing in said chambers at the end of said necks adapted to form seals and prevent thereby the water from running into the bearing and the oil therefrom.

In testimony that I claim the foregoing I have hereto set my hand this 5th day of February, 1914, in the presence of witnesses.

FERDINAND W. KROGH.

Witnesses:
L. M. WILLIAMS,
M. MARKEL.